United States Patent
Tao et al.

(10) Patent No.: US 11,410,685 B1
(45) Date of Patent: Aug. 9, 2022

(54) METHOD FOR DETECTING VOICE SPLICING POINTS AND STORAGE MEDIUM

(71) Applicant: INSTITUTE OF AUTOMATION, CHINESE ACADEMY OF SCIENCES, Beijing (CN)

(72) Inventors: Jianhua Tao, Beijing (CN); Ruibo Fu, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/668,074

(22) Filed: Feb. 9, 2022

(30) Foreign Application Priority Data

Sep. 23, 2021 (CN) .......................... 202111116267.3

(51) Int. Cl.
*G10L 25/87* (2013.01)
*G06N 3/04* (2006.01)
(Continued)

(52) U.S. Cl.
CPC ............ *G10L 25/87* (2013.01); *G06N 3/0454* (2013.01); *G10L 25/24* (2013.01); *G10L 25/30* (2013.01)

(58) Field of Classification Search
CPC ......... G10L 25/87; G10L 25/24; G10L 25/30; G10L 21/038; G10L 15/02;
(Continued)

(56) References Cited

U.S. PATENT DOCUMENTS 10,008,218 B2 * 6/2018 Wu .......................... G10L 19/26
10,026,395 B1 * 7/2018 Bekolay .................. G10L 25/21
(Continued)

FOREIGN PATENT DOCUMENTS

CN 102063899 A 5/2011
CN 106941008 A 7/2017
(Continued)

OTHER PUBLICATIONS

First Office Action issued in counterpart Chinese Patent Application No. 202111116267.3, dated Nov. 5, 2021.
(Continued)

*Primary Examiner* — Linda Wong
(74) *Attorney, Agent, or Firm* — Westbridge IP LLC (57) ABSTRACT

Disclosed are a method for detecting speech concatenating points and a storage medium. The method includes: acquiring a speech to be detected, and determining high-frequency components and low-frequency components of the speech to be detected; extracting first cepstrum features and second cepstrum features corresponding to the speech to be detected according to the high-frequency components and the low-frequency components; splicing the first and the second cepstrum feature of speech per frame in the speech to be detected in units of frame so as to obtain a parameter sequence; inputting the parameter sequence into a neural network model so as to obtain a feature sequence corresponding to the speech to be detected, wherein the model has been trained, has learned and stored a correspondence between the parameter sequence and the feature sequence; and performing detection of speech concatenating points on the speech to be detected according to the feature sequence.

11 Claims, 5 Drawing Sheets

(51) Int. Cl.
*G10L 25/30* (2013.01)
*G10L 25/24* (2013.01)

(58) Field of Classification Search
CPC . G10L 19/0208; G10L 15/16; G10L 21/0232;
G10L 19/02; G10L 25/18; G10L 15/063;
G10L 19/00; G10L 21/02; G10L 19/16;
G10L 19/265; G10L 19/06; G10L 19/167;
G10L 17/18; G10L 19/26; G10L 15/142;
G10L 15/20; G10L 17/26; G10L 17/04;
G10L 25/00; G10L 15/00; G10L 15/183;
G06N 3/0454; G06N 3/08; G06N 20/00;
G06N 3/049; G06F 17/142; G06F 17/147
See application file for complete search history.

(56) References Cited

U.S. PATENT DOCUMENTS

| | | | |
|---|---|---|---|
| 10,446,133 B2 * | 10/2019 | Yanagisawa | G10L 13/08 |
| 10,726,828 B2 * | 7/2020 | Fukuda | G10L 15/063 |
| 11,120,789 B2 * | 9/2021 | Fan | G10L 15/063 |
| 2001/0047266 A1 | 11/2001 | Fasciano | |
| 2003/0139926 A1 | 7/2003 | Jia et al. | |
| 2012/0201399 A1 * | 8/2012 | Mitsufuji | G10L 21/0388 |
| | | | 381/98 |
| 2016/0248768 A1 | 8/2016 | McLaren et al. | |
| 2021/0193174 A1 | 6/2021 | Enzinger et al. | |

FOREIGN PATENT DOCUMENTS

| | | |
|---|---|---|
| CN | 110853668 A | 2/2020 |
| CN | 111128234 A | 5/2020 |
| CN | 111564163 A | 8/2020 |
| CN | 113284513 A | 8/2021 |
| WO | WO-2021161924 A1 * | 8/2021 |

OTHER PUBLICATIONS

Qiang et al., Text Enhancement for Paragraph Processing in End-to-End Code-switching TTS, 2021 12th International Symposium on Chinese Spoken Language Processing (ISCSLP), dated Mar. 31, 2021.

Tao et al., Development and Challenge of Speech Forgery and Detection, Journal of Cyber Security, pp. 28-38, vol. 5, No. 2, dated Mar. 31, 2020.

Zhong et al., Splicing Feature Extraction and Analysis Based on Fractional Cepstrum Transform in Voice Forensics, Journal of Data Acquisition and Processing, pp. 248-253, vol. 29, No. 2, dated Mar. 31, 2014.

Zhu et al., Research of Characteristic Parameters Extraction Based on Embedded Speech Recognition System, pp. 246-249, vol. 21, No. 7, dated Jul. 31, 2011.

* cited by examiner

METHOD FOR DETECTING VOICE SPLICING POINTS AND STORAGE MEDIUM

CROSS-REFERENCE TO RELATED APPLICATIONS

The present disclosure claims priority to Chinese Patent Application 202111116267.3 entitled "Method for detecting speech concatenating points and storage medium" filed on Sep. 23, 2021, the entire content of which is incorporated herein by reference.

TECHNICAL FIELD

The present disclosure relates to the field of speech detection, and more particularly to a method for detecting speech concatenating points and storage medium.

BACKGROUND OF THE INVENTION

The detection of audio or speech concatenating points is significantly important so as to capture more discriminative information of speech and voice. In traditional techniques for detecting speech concatenating points, a single acoustic feature, such as Mel Frequency Cepstral Coefficient (MFCC), Linear Frequency Cepstral Coefficient (LFCC), and Linear Predictive Coefficient (LPC), is generally utilized. If the speech concatenating points are detected by a single acoustic feature, there may be a mismatch on characteristics represented by the actual difference of the speech concatenating points, which thus will cause errors in detection of the speech concatenating points.

In the process of realizing the concept of the present disclosure, the inventor found that there are at least the following technical problems in the prior art: detecting speech concatenating points by means of a single acoustic feature, and low accuracy of the detection of the speech concatenating points.

SUMMARY OF THE INVENTION

In order to solve the above technical problems or at least partially solve the above technical problems, the embodiments of the present disclosure provide a method for detecting speech concatenating points and a storage medium, so as to at least solve the problems of detecting speech concatenating points by means of a single acoustic feature and low accuracy of the detection of the speech concatenating points in the prior art.

The purpose of the present disclosure is achieved through the following technical solutions.

In the first aspect, an embodiment of the present disclosure provides a method for detecting speech concatenating points, the methods includes: acquiring a speech to be detected, and determining high-frequency components and low-frequency components of the speech to be detected; extracting first cepstrum features and second cepstrum features corresponding to the speech to be detected according to the high-frequency components and the low-frequency components; splicing the first cepstrum feature and the second cepstrum feature of speech per frame in the speech to be detected in units of frame so as to obtain a parameter sequence; inputting the parameter sequence into a neural network model so as to obtain a feature sequence corresponding to the speech to be detected, wherein the neural network model has been trained, has learned and stored a correspondence between the parameter sequence and the feature sequence; and performing detection of speech concatenating points on the speech to be detected according to the feature sequence.

In an exemplary embodiment, performing detection of speech concatenating points on the speech to be detected according to the feature sequence includes: calculating a difference value of values in the feature sequences respectively corresponding to speech of any two frames in the speech to be detected in units of frame so as to obtain a first distance matrix; processing the first distance matrix by means of a clustering algorithm so as to obtain a second distance matrix; and performing detection of speech concatenating points on the speech to be detected according to the second distance matrix.

In an exemplary embodiment, after calculating the difference value of the values in the feature sequences respectively corresponding to speech of any two frames in the speech to be detected in units of frame so as to obtain the first distance matrix, the method further includes: updating a value in the first distance matrix that is greater than a preset threshold to a first value, and updating a value in the first distance matrix that is less than the preset threshold to a second value, so as to obtain the second distance matrix; and determining that the speech of two frames corresponding to the second value in the second distance matrix are the speech concatenating points of the speech to be detected.

In an exemplary embodiment, inputting the parameter sequence into the neural network model so as to obtain the feature sequence corresponding to the speech to be detected includes: inputting the parameter sequence into an encoder network so as to obtain a hidden variable sequence, wherein the neural network model includes the encoder network; and inputting the hidden variable sequence into a decoder network so as to obtain the feature sequence, wherein the neural network model includes the decoder network.

In an exemplary embodiment, the encoder network includes a multilayer perceptron network; and the decoder network includes a multilayer recurrent neural network, wherein, the encoder network and the decoder network perform operations on respective inputs thereof in units of frame.

In an exemplary embodiment, the first cepstrum features are Mel frequency cepstrum coefficients, and the second cepstrum features are constant q transform cepstrum coefficients.

In an exemplary embodiment, the method further includes: acquiring a speech to be trained, wherein the speech to be trained includes: speech obtained by speech concatenating and speech obtained not by speech concatenating; extracting third cepstrum features and fourth cepstrum features corresponding to the speech to be trained according to high-frequency components and low-frequency components of the speech to be trained; splicing the third cepstrum feature and the fourth cepstrum feature of speech per frame in the speech to be trained in units of frame so as to obtain a parameter sequence of the speech to be trained; performing a first labeling process on the parameter sequence of the speech to be trained; and training the neural network model by means of the parameter sequence after being subject to the first labeling process.

In an exemplary embodiment, after splicing the third cepstrum feature and the fourth cepstrum feature of speech per frame in the speech to be trained in units of frame so as to obtain the parameter sequence of the speech to be trained, the method further includes: defining a third distance matrix of the parameter sequence of the speech to be trained; performing a labeling process on the third distance matrix, and training the neural network model by means of the third distance matrix after being subject to the labeling process.

In the second aspect, an embodiment of the present disclosure provides another method for detecting speech concatenating points, the methods includes: acquiring a speech to be detected, and determining high-frequency components and low-frequency components of the speech to be detected; extracting first cepstrum features and second cepstrum features corresponding to the speech to be detected according to the high-frequency components and the low-frequency components; splicing the first cepstrum feature and the second cepstrum feature of speech per frame in the speech to be detected in units of frame so as to obtain a parameter sequence; and according to the parameter sequence, performing detection of speech concatenating points on the speech to be detected by means of a neural network model, wherein, the neural network model has been trained, has learned and stored a correspondence between the parameter sequence and the speech concatenating points.

In the third aspect, an embodiment of the present disclosure provides an electronic device. The electronic device includes a processor, a communication interface, a memory and a communication bus, in which the processor, the communication interface and the memory communicate with each other by the communication bus. Specifically, the memory is configured to store computer programs, and when the processor executes the programs stored in the memory, the above-mentioned method for detecting speech concatenating points is achieved.

In the fourth aspect, an embodiment of the present disclosure provides a computer-readable storage medium. The computer-readable storage medium stores computer programs therein, and when the computer programs are executed by the processor, the above-mentioned method for detecting speech concatenating points is achieved.

Compared with the prior art, the above-mentioned technical solutions provided by the embodiments of the present disclosure have at least some or all of the following advantages: acquiring a speech to be detected, and determining high-frequency components and low-frequency components of the speech to be detected; extracting first cepstrum features and second cepstrum features corresponding to the speech to be detected according to the high-frequency components and the low-frequency components; splicing the first cepstrum feature and the second cepstrum feature of speech per frame in the speech to be detected in units of frame to obtain a parameter sequence; inputting the parameter sequence into a neural network model so as to obtain a feature sequence corresponding to the speech to be detected, wherein the neural network model has been trained, has learned and stored a correspondence between the parameter sequence and the feature sequence; and performing the detection of speech concatenating points on the speech to be detected according to the feature sequence. In the embodiment of the present disclosure, due to that the first cepstrum features and the second cepstrum features corresponding to the speech to be detected may be extracted according to difference information between the high-frequency components and the low-frequency components of the speech to be detected; the first cepstrum feature and the second cepstrum feature of speech per frame in the speech to be detected are spliced in units of frame to obtain a parameter sequence; and the detection of speech concatenating points on the speech to be detected is performed according to the parameter sequence, the problems of detecting speech concatenating points by means of single acoustic features, and low accuracy of the detection of speech concatenating points in the prior art may be solved by adopting the above-mentioned technical solutions, thereby improving the accuracy of the detection on the speech concatenating points.

BRIEF DESCRIPTION OF THE DRAWINGS

The accompanying drawings herein, which are incorporated into the specification and constitute a part of the specification, show embodiments in accordance with the present disclosure and are used to explain the principle of the present disclosure together with the specification.

In order to more clearly describe the technical solutions in the embodiments of the present disclosure or the prior art, the accompanying drawings necessarily used for the description of the embodiments or related art will be briefly introduced in the following. It is obvious for those of ordinary skill in the art to obtain other accompanying drawings from these accompanying drawings without paying creative labor.

DETAILED DESCRIPTION OF THE INVENTION

Hereinafter, the present disclosure will be described in detail with reference to the accompanying drawings and in conjunction with the embodiments. It should be noted that the embodiments and the features in the embodiments in the present disclosure may be combined with each other without conflicts.

It should be noted that the terms "first" and "second" in the specification and claims of the present disclosure as well as the above-mentioned accompanying drawings are used to distinguish similar objects, and not necessarily used to describe a specific sequence or order.

Figure 1:
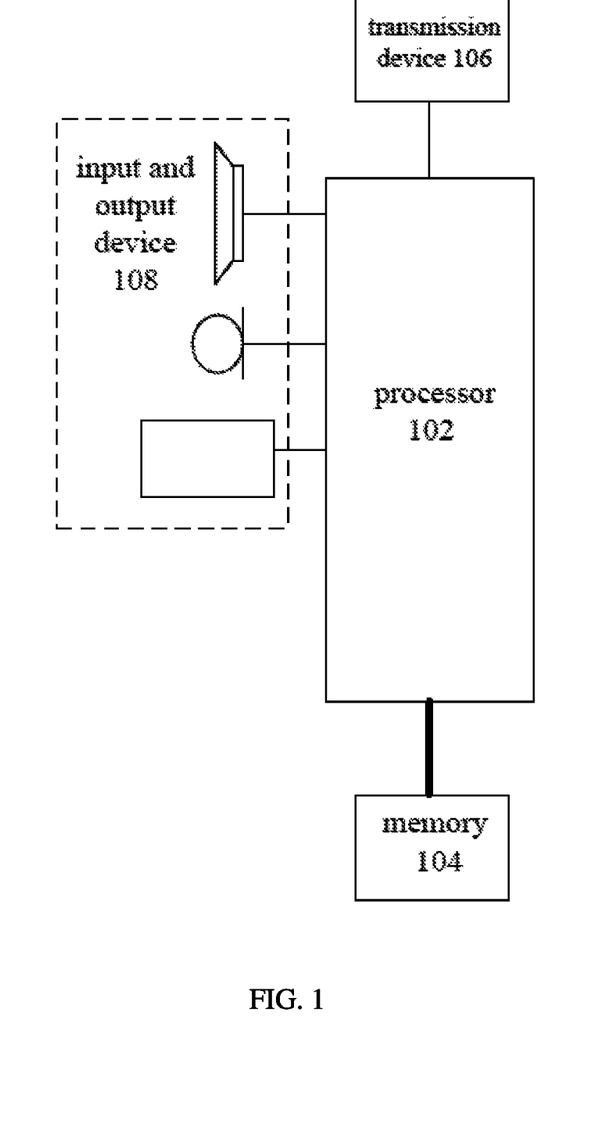
FIG. 1 schematically illustrates a structural block diagram of hardware of a computer terminal of a method for detecting speech concatenating points according to an embodiment of the present disclosure.

The method embodiment provided in the embodiments of the present disclosure may be executed in a computer terminal or similar computing device. Taking running on a computer terminal as an example, FIG. 1 schematically illustrates a structural block diagram of hardware of a computer terminal of a method for detecting speech concatenating points according to an embodiment of the present disclosure. As shown in FIG. 1, the computer terminal may include processing devices such as one or more processors 102 (only one is shown in FIG. 1) (the processor 102 may include, but is not limited to, a microprocessor (Microprocessor Unit, MPU for short) or programmable logic device (PLD for short)) and a memory 104 for storing data. Alternatively, the above-mentioned computer terminal may also include a transmission device 106 for communication functions and an input and output device 108. Those of ordinary skill in the art may appreciate that the structure shown in FIG. 1 is merely schematically, which does not limit the structure of the above-mentioned computer terminal. For example, the computer terminal may also include more or less components than those shown in FIG. 1, or may have configurations with equivalent functions of those shown in FIG. 1, or have more different configurations with more functions than those shown in FIG. 1.

The memory 104 may be used to store computer programs, for example, software programs and modules of application software, such as the computer programs corresponding to the method for detecting speech concatenating points in the embodiment of the present disclosure. The above-mentioned method is realized by the processor 102 running the computer programs stored in the memory 104 so as to execute various functional applications and data processing. The memory 104 may include a high-speed random access memory, and may also include a non-volatile memory, such as one or more magnetic storage devices, flash memory, or other non-volatile solid-state memory. In some examples, the memory 104 may further include a memory remotely provided with respect to the processor 102, and these remote memories may be connected to the computer terminal through a network. Examples of the above-mentioned network include, but are not limited to, the Internet, corporate intranets, local area networks, mobile communication networks, and combinations thereof.

The transmission device 106 is used to receive or transmit data via a network. Specific examples of the above-mentioned network include a wireless network provided by a communication provider of the computer terminal. In an example, the transmission device 106 includes a network adapter (Network Interface Controller, NIC for short), which may be connected to other network devices through a base station so as to communicate with the Internet. In an example, the transmission device 106 may be a radio frequency (RF for short) module, which is used to communicate with the Internet in a wireless manner.

Figure 2:
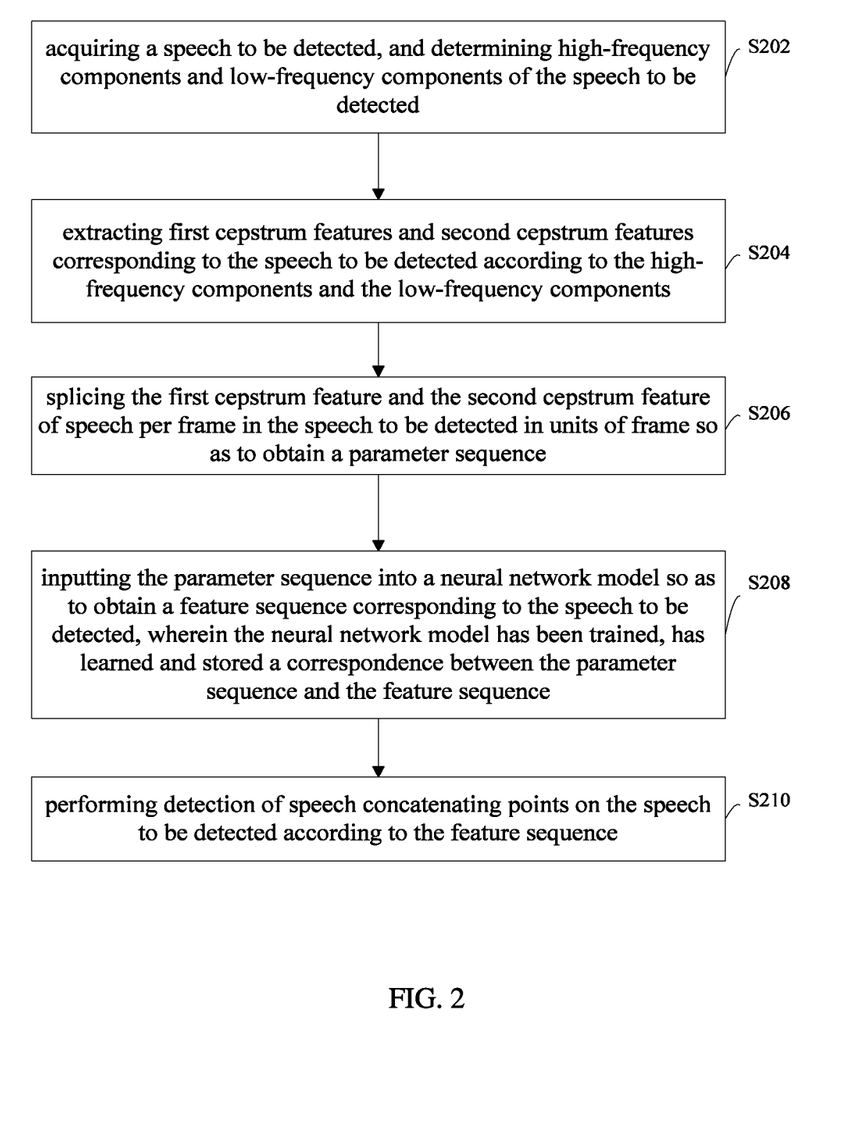
FIG. 2 schematically illustrates a flowchart (1) of a method for detecting speech concatenating points according to an embodiment of the present disclosure.

The embodiment of the present disclosure provides a method for detecting speech concatenating points. FIG. 2 schematically illustrates a flowchart (1) of the method for detecting speech concatenating points according to the embodiment of the present disclosure. As shown in FIG. 2, the process includes the following steps:

Step S202: acquiring a speech to be detected, and determining high-frequency components and low-frequency components of the speech to be detected;
Step S204: extracting first cepstrum features and second cepstrum features corresponding to the speech to be detected according to the high-frequency components and the low-frequency components;
Step S206: splicing the first cepstrum feature and the second cepstrum feature of speech per frame in the speech to be detected in units of frame to obtain a parameter sequence;
Step S208: inputting the parameter sequence into a neural network model so as to obtain a feature sequence corresponding to the speech to be detected, wherein the neural network model has been trained, has learned and stored a correspondence between the parameter sequence and the feature sequence; and
Step S210: performing detection of speech concatenating points on the speech to be detected according to the feature sequence.

It should be noted that both the first cepstrum feature and the second cepstrum feature include the high frequency component and the low frequency component, and the difference between the first cepstrum feature and the second cepstrum feature lies in: proportions of the high-frequency component and the low-frequency component included by the first cepstrum feature and the second cepstrum feature are different. For example, the first cepstrum feature focuses more on the low-frequency component, and the first cepstrum feature includes more low-frequency component than the high-frequency component. For example, the first cepstrum feature may be a Mel Frequency Cepstral Coefficients (MFCC). On the other hand, the second cepstrum feature focuses more on the high-frequency component, and the second cepstrum feature includes more high-frequency component than the low-frequency component. For example, the second cepstrum feature may be a Constant Q Transform Cepstrum Coefficients (CQCC). It is obvious that the first cepstrum feature may focus more on the high-frequency component while the second cepstrum feature focuses more on the low-frequency component, as long as the first cepstrum feature and the second cepstrum feature have different focus points with each other.

In the present disclosure, the speech to be detected is acquired, and the high-frequency components and the low-frequency components of the speech to be detected are determined; the first cepstrum features and the second cepstrum features corresponding to the speech to be detected are extracted according to the high-frequency components and the low-frequency components; the first cepstrum feature and the second cepstrum feature of speech per frame in the speech to be detected are spliced in units of frame so as to obtain the parameter sequence; the parameter sequence is inputted into the neural network model, and then the feature sequence corresponding to the speech to be detected is outputted from the neural network model, wherein the neural network model has been trained, has learned and stored the correspondence between the parameter sequence and the feature sequence; and the detection of speech concatenating points on the speech to be detected is performed according to the feature sequence. In the embodiment of the present disclosure, due to that the first cepstrum features and the second cepstrum features corresponding to the speech to be detected may be extracted according to difference information between the high-frequency components and the low-frequency components of the speech to be detected; the first cepstrum feature and the second cepstrum feature of speech per frame in the speech to be detected are spliced in units of frame so as to obtain the parameter sequence; and the detection of speech concatenating points on the speech to be detected is performed according to the parameter sequence, the problems of detecting speech concatenating points by means of single acoustic features, and low accuracy of the detection of speech concatenating points in the prior art may be solved by adopting the above-mentioned technical solutions, thereby improving the accuracy of the detection on the speech concatenating points.

In step S210, performing detection of the speech concatenating points on the speech to be detected according to the feature sequence includes: calculating a difference value of values in the feature sequences respectively corresponding to speech of any two frames in the speech to be detected in units of frame to obtain a first distance matrix; processing the first distance matrix by means of a clustering algorithm to obtain a second distance matrix; and performing detection of the speech concatenating points on the speech to be detected according to the second distance matrix.

In order to understand this embodiment, firstly, it is necessary to explain a training process of the neural network model. In the training of the neural network model, a distance matrix $A_{i,j}$ of N*N dimensions ($A_{i,j}=|x_i-x_j|$) is defined. The distance matrix $A_{i,j}$ is used to describe a distance between each frame of audio, which is also a training prediction target of the neural network model. i and j are the sequence numbers of elements in the feature sequence, and i and j may also be the sequence numbers of speech of any two frames in the speech to be detected corresponding to the elements in the feature sequence. In addition, $x_i$ and $x_j$ represent values in the feature sequence respectively corresponding to speech of any two frames in the speech to be detected. The values in the feature sequence respectively corresponding to speech of any two frames in the speech to be detected may be values of the elements in the feature sequence respectively corresponding to speech of any two frames in the speech to be detected.

Specifically, $A_{i,j}$ may be marked as follows:

$$A_{i,j} = \begin{cases} 1, \text{if speech in an } i-th \text{ frame and speech in an } j-th \text{ frame are from the same audio} \\ 0, \text{if speech in an } i-th \text{ frame and speech in an } j-th \text{ frame are from differenct audio} \end{cases}.$$

The corresponding element in $A_{i,j}$ is marked as 1 when the speech in the i-th frame and the speech in the j-th frame are from the same audio, i.e., the speech in the i-th frame and the speech in the j-th frame are not spliced audio. Similarly, the corresponding element in $A_{i,j}$ is marked as 0 when the speech in the i-th frame and the speech in the j-th frame are from the different audios, i.e., the speech in the i-th frame and the speech in the j-th frame are spliced audio. The neural network model is trained by means of the $A_{i,j}$ after subject to the above-mentioned marking.

After the training of the neural network model has completed, when the speech concatenating points are detected by using the neural network model, difference value of the values in the feature sequences respectively corresponding to speech of any two frames in the speech to be detected is calculated so as to obtain the first distance matrix. The first distance matrix may be subject to normalization, and values of the elements in the first distance matrix may be between 0 and 1. The first distance matrix is processed by means of a clustering algorithm. In such a process, the value of an element, which is greater than a preset threshold, in the first distance matrix may be updated as a first value (e.g., the first value may be 1), and the value of an element, which is less than the preset threshold, in the first distance matrix may be updated as a second value (e.g., the second value may be 0), such that a second distance matrix is obtained. If the preset threshold is assumed to be 0.6, the value of an element, which is greater than 0.6, in the first distance matrix may be updated as 1, and the value of an element, which is less than 0.6, in the first distance matrix may be updated as 0, so that the second distance matrix, of which all elements are either 1 or 0, is obtained. That is, the second distance matrix is the same as the distance matrix $A_{i,j}$. The speech in two frames corresponding to the elements with value of 1 in the second distance matrix are determined as from the same audio, and the speech in two frames corresponding to the elements with value of 0 in the second distance matrix are determined as from the different audios.

In step S210, after calculating the difference value of the values in the feature sequences respectively corresponding to speech of any two frames in the speech to be detected in units of frame so as to obtain the first distance matrix, the method further includes: updating the values greater than the preset threshold in the first distance matrix as the first value, updating the values less than the preset threshold in the first distance matrix as the second value so as to obtain the second distance matrix; and determining that the speech of two frames corresponding to the second value in the second distance matrix are speech concatenating points of the speech to be detected.

Alternatively, determining that the speech of two frames corresponding to the first value in the second distance matrix are not the speech concatenating points of the speech to be detected.

It should be noted that, in terms of effects, determining whether speech of the two frames corresponding to the first value or the second value are the speech concatenating points of the speech to be detected or not is equivalent to determining whether the speech to be detected is obtained by speech splicing or not.

In step S208, inputting the parameter sequence into a neural network model, so as to obtain a feature sequence corresponding to the speech to be detected includes: inputting the parameter sequence into an encoder network so as to obtain a hidden variable sequence, wherein the neural network model includes the encoder network; and inputting the hidden variable sequence into a decoder network so as to obtain the feature sequence, wherein the neural network model includes the decoder network.

The neural network model may be a first-encoding and then-decoding model consists of the encoder network and the decoder network. The neural network model may also include the encoder network, the decoder network, a matrix calculation network, and a detection network. Among them, the matrix calculation network may be utilized to realize the above calculation of the first distance matrix and the second distance matrix, and the detection network may be utilized to realize the detection of speech concatenating points on the speech to be detected according to the second distance matrix. If the neural network model only includes the encoder network and the decoder network, in the embodiment of the present disclose, the matrix calculation network and the detection network may be added correspondingly after the neural network model.

The parameter sequence may be a sequence of combined acoustic parameters related to the first cepstrum features and the second cepstrum features, and the feature sequence may be a frame-level feature sequence with consistency.

The encoder network includes a multilayer perceptron network, and the decoder network includes a multilayer recurrent neural network. Both the encoder network and the decoder network perform operations on respective inputs thereof in units of frame.

The perceptron network is utilized to implement a perceptron algorithm. The perceptron algorithm is a good two-category online algorithm. The perceptron algorithm is required to be a linearly separable model. The perceptron corresponds to dividing the instances into positive and negative samples in a space of inputs, and a separation hyperplane, that is a determining model, is utilized to separate the positive and negative samples. In the recurrent neural network, the current output of a sequence is also related to the previous output. Specifically, the network will memorize the previous information and apply it to the calculation of the current output, that is, nodes between the hidden layers in the recurrent neural network are connected rather than disconnected, and the input of the hidden layers includes not only output of input layers but also the output of the hidden layers at the previous moment. In order to make the feature sequence to be a frame-level sequence, the operations performed by the encoder network and the decoder network on respective inputs thereof are all in units of frame.

The first cepstrum features are Mel frequency cepstrum coefficients (MFCC), and the second cepstrum features are constant q transform cepstrum coefficients.

The Mel frequency cepstrum coefficients (MFCC) and the constant q transform cepstrum coefficients may be Constant Q Transform Cepstrum Coefficients (CQCC). In the case of taking extraction of MFCC of the speech as an example, Fourier transform is performed on the speech to obtain a spectrogram, then the spectrogram is multiplied by the MEL Cepstrum coefficient to obtain the Mel spectrum feature, and finally the MFCC coefficient is extracted according to the Mel spectrum feature.

Before step S208, that is, before inputting the parameter sequence into the neural network model so as to obtain the feature sequence corresponding to the speech to be detected, the method further includes training the neural network model, training the neural network model includes: acquiring a speech to be trained, wherein the speech to be trained includes: speech obtained by speech concatenating and speech obtained not by speech concatenating; extracting third cepstrum features and fourth cepstrum features corresponding to the speech to be trained according to high-frequency components and low-frequency components of the speech to be trained; splicing the third cepstrum feature and the fourth cepstrum feature of speech per frame in the speech to be trained in units of frame to obtain a parameter sequence of the speech to be trained; performing a first labeling process on the parameter sequence of the speech to be trained; and training the neural network model by means of the parameter sequence after being subject to the first labeling process.

It should be noted that the third cepstrum features and the fourth cepstrum features are actually the same as the first cepstrum features and the second cepstrum features, respectively, the purpose of different naming is just to distinguish whether they are features extracted from the speech to be trained or from the speech to be detected.

It should be noted that performing the first labeling process on the parameter sequence of the speech to be trained is to label the parameter sequence with a corresponding feature sequence.

In an embodiment of the present embodiment, the neural network model is trained by means of the parameter sequence after being subject to the labeling process, such that the neural network model has learned and stored the correspondence between the parameter sequence and the feature sequence. Further, when detecting speech concatenating points on the speech to be detected through the neural network model, the feature sequence is outputted from the neural network model, thereby the detection of speech concatenating points on the speech to be detected is performed according to the feature sequence.

After splicing the third cepstrum feature and the fourth cepstrum feature of speech per frame in the speech to be trained in units of frame so as to obtain the parameter sequence of the speech to be trained, the method further includes: defining a third distance matrix of the parameter sequence of the speech to be trained; performing a labeling process on the third distance matrix, and training the neural network model by means of the third distance matrix after being subject to the labeling process.

The third distance matrix defined is the distance matrix $A_{i,j}$.

Alternatively, defining the third distance matrix of the parameter sequence of the speech to be trained includes: inputting the parameter sequence into the encoder network so as to obtain the hidden variable sequence; inputting the hidden variable sequence into the decoder network so as to obtain the feature sequence; and defining the third distance matrix of the feature sequence.

Figure 3:
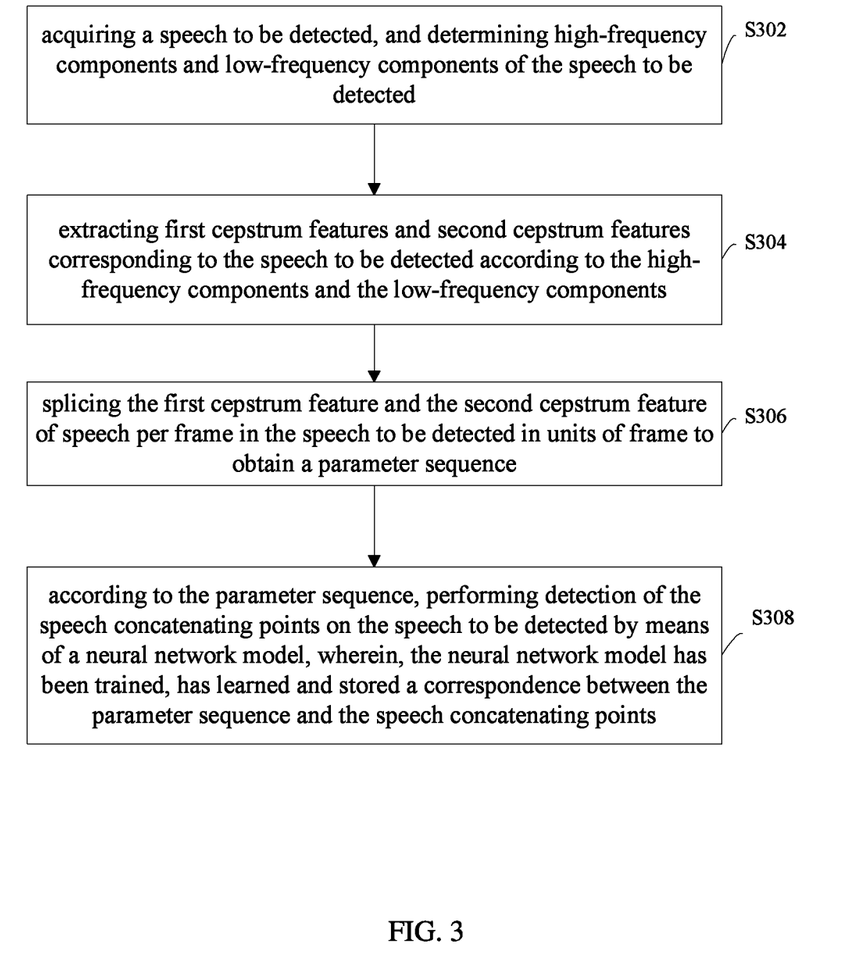
FIG. 3 schematically illustrates a flowchart (2) of a method for detecting speech concatenating points according to an embodiment of the present disclosure.

In an embodiment of the present disclosure, another method for detecting speech concatenating points is provided. FIG. 3 schematically illustrates a flowchart (2) of the method for detecting speech concatenating points according to the embodiment of the present disclosure. As shown in FIG. 3, the process includes the following steps:

Step S302: acquiring a speech to be detected, and determining high-frequency components and low-frequency components of the speech to be detected;

Step S304: extracting first cepstrum features and second cepstrum features corresponding to the speech to be detected according to the high-frequency components and the low-frequency components;

Step S306: splicing the first cepstrum feature and the second cepstrum feature of speech per frame in the speech to be detected in units of frame to obtain a parameter sequence; and Step S308: according to the parameter sequence, performing detection of the speech concatenating points on the speech to be detected by means of a neural network model, wherein, the neural network model has been trained, has learned and stored a correspondence between the parameter sequence and the speech concatenating points.

In the present disclosure, the speech to be detected is acquired, and the high-frequency components and the low-frequency components of the speech to be detected are determined; the first cepstrum features and the second cepstrum features corresponding to the speech to be detected are extracted according to the high-frequency components and the low-frequency components; the first cepstrum feature and the second cepstrum feature of speech per frame in the speech to be detected are spliced in units of frame so as to obtain the parameter sequence; and the detection of speech concatenating points on the speech to be detected is performed according to the parameter sequence by means of the neural network model, wherein the neural network model has been trained, has learned and stored the correspondence between the parameter sequence and the speech concatenating points. In the embodiment of the present disclosure, due to that the first cepstrum features and the second cepstrum features corresponding to the speech to be detected may be extracted according to difference information between the high-frequency components and the low-frequency components of the speech to be detected; the first cepstrum feature and the second cepstrum feature of speech per frame in the speech to be detected are spliced in units of frame so as to obtain the parameter sequence; and the detection of speech concatenating points on the speech to be detected is performed according to the parameter sequence, the problems of detecting speech concatenating points by means of single acoustic features, and low accuracy of the detection of the speech concatenating points in the prior art may be solved by adopting the above-mentioned technical solutions, thereby improving the accuracy of the detection on the speech concatenating points.

The parameter sequence is inputted into the neural network model and the speech concatenating points of the speech to be detected are outputted from the neural network model.

Before step S308, that is, before performing detection of speech concatenating points on the speech to be detected by means of a neural network model according to the parameter sequence, the method further includes training the neural network model, training the neural network model includes: acquiring a speech to be trained, wherein the speech to be trained includes: speech obtained by speech concatenating and speech obtained not by speech concatenating; extracting third cepstrum features and fourth cepstrum features corresponding to the speech to be trained according to high-frequency components and low-frequency components of the speech to be trained; splicing the third cepstrum feature and the fourth cepstrum feature of speech per frame in the speech to be trained in units of frame so as to obtain a parameter sequence of the speech to be trained; performing a second labeling process on the parameter sequence of the speech to be trained; and training the neural network model by means of the parameter sequence after being subject to the second labeling process.

It should be noted that the third cepstrum features and the fourth cepstrum features are actually the same as the first cepstrum features and the second cepstrum features, respectively, the purpose of different naming is just to distinguish whether they are features extracted from the speech to be trained or from the speech to be detected.

It should be noted that performing the second labeling process on the parameter sequence of the speech to be trained is to label the parameter sequence with corresponding speech concatenating points.

In an embodiment of the present embodiment, the neural network model is trained by means of the parameter sequence after being subject to the labeling process, such that the neural network model has learned and stored the correspondence between the parameter sequence and the speech concatenating points. Further, when detecting speech concatenating points on the speech to be detected through the neural network model, it is recognized whether the speech to be detected is obtained by speech concatenating or not, and the location of the speech concatenating may be recognized at the same time.

After splicing the third cepstrum feature and the fourth cepstrum feature of speech per frame in the speech to be trained in units of frame so as to obtain the parameter sequence of the speech to be trained, the method further includes: defining a third distance matrix of the parameter sequence of the speech to be trained; performing a labeling process on the third distance matrix, and training the neural network model by means of the third distance matrix after being subject to the labeling process.

The third distance matrix defined is the distance matrix $A_{i,j}$.

Alternatively, defining the third distance matrix of the parameter sequence of the speech to be trained includes: inputting the parameter sequence into the encoder network so as to obtain the hidden variable sequence; inputting the hidden variable sequence into the decoder network so as to obtain the feature sequence; and defining the third distance matrix of the feature sequence.

Through the description of the above embodiments, those of ordinary skill in the art can clearly understand that the method according to the above embodiments may be implemented by means of software plus necessary general hardware platform, or of course by means of hardware, but in many cases the former is a better implementation. Based on such understanding, the technical solution of the present disclosure essentially or the part that contributes to the prior art can be embodied in the form of a software product, and the computer software product is stored in a storage medium (such as a Read-Only Memory (ROM for short), a Random Access Memory (RAM for short), a magnetic disk, an optical disk), and includes several instructions to cause a terminal device (which may be a mobile phone, a computer, a component server, or a network equipment, etc.) to perform various embodiments of the present disclosure.

In an embodiment of the present disclosure, a device for detecting speech concatenating points is further provided. The device for detecting speech concatenating points is utilized to implement the above-mentioned embodiments and preferred implementations, and what has been described will not be repeated. As used below, the term "module" may be implemented as a combination of software and/or hardware with predetermined functions. Although the devices described in the following embodiments are preferably implemented by software, implementation by hardware or a combination of software and hardware is also possible and conceived.

Figure 4:
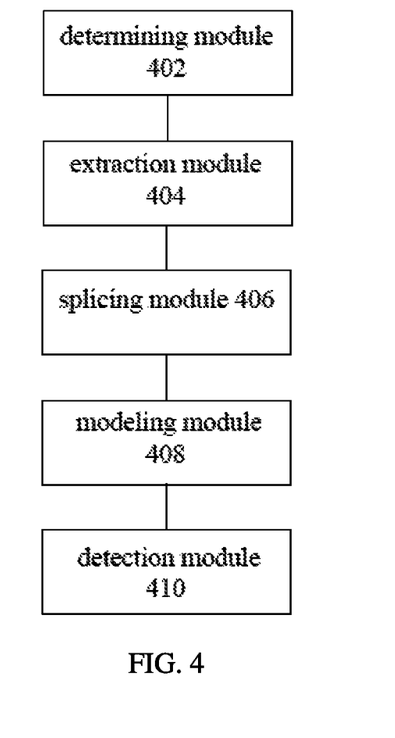
FIG. 4 schematically illustrates a structural block diagram (1) of a device for detecting speech concatenating points according to an embodiment of the present disclosure.

FIG. 4 schematically illustrates a structural block diagram (1) of a device for detecting speech concatenating points according to an embodiment of the present disclosure, and as shown in FIG. 4, the device includes:

a determining module 402 configured to acquire a speech to be detected and determine high-frequency components and low-frequency components of the speech to be detected;

an extraction module 404 configured to extract first cepstrum features and second cepstrum features corresponding to the speech to be detected according to the high-frequency components and the low-frequency components;

a splicing module 406 configured to splice the first cepstrum feature and the second cepstrum feature of speech per frame in the speech to be detected in units of frame so as to obtain a parameter sequence;

a modeling module 408 configured to input the parameter sequence into a neural network model so as to obtain a feature sequence corresponding to the speech to be detected, wherein the neural network model has been trained, has learned and stored a correspondence between the parameter sequence and the feature sequence; and a detection module 410 configured to perform detection of speech concatenating points on the speech to be detected according to the feature sequence.

It should be noted that both the first cepstrum feature and the second cepstrum feature include the high frequency component and the low frequency component, and the difference between the first cepstrum feature and the second cepstrum feature lies in: proportions of the high-frequency component and the low-frequency component included by the first cepstrum feature and the second cepstrum feature are different. For example, the first cepstrum feature focuses more on the low-frequency component, and the first cepstrum feature includes more low-frequency component than the high-frequency component. For example, the first cepstrum feature may be a Mel Frequency Cepstral Coefficient (MFCC). On the other hand, the second cepstrum feature focuses more on the high-frequency component, and the second cepstrum feature includes more high-frequency component than the low-frequency component. For example, the second cepstrum feature may be a Constant Q Transform Cepstrum Coefficient (CQCC). It is obvious that the first cepstrum feature may focus more on the high-frequency component while the second cepstrum feature focuses more on the low-frequency component, as long as the first cepstrum feature and the second cepstrum feature have different focus points with each other.

In the present disclosure, the speech to be detected is acquired, and the high-frequency components and the low-frequency components of the speech to be detected are determined; the first cepstrum features and the second cepstrum features corresponding to the speech to be detected are extracted according to the high-frequency components and the low-frequency components; the first cepstrum feature and the second cepstrum feature of speech per frame in the speech to be detected are spliced in units of frame so as to obtain the parameter sequence; the parameter sequence is inputted into the neural network model, and then the feature sequence corresponding to the speech to be detected is outputted from the neural network model, wherein the neural network model has been trained, has learned and stored the correspondence between the parameter sequence and the feature sequence; and the detection of speech concatenating points on the speech to be detected is performed according to the feature sequence. In the embodiment of the present disclosure, due to that the first cepstrum features and second cepstrum features corresponding to the speech to be detected may be extracted according to difference information between the high-frequency components and the low-frequency components of the speech to be detected; the first cepstrum feature and the second cepstrum feature of speech per frame in the speech to be detected are spliced in units of frame so as to obtain the parameter sequence; and the detection of speech concatenating points on the speech to be detected is performed according to the parameter sequence, the problems of detecting speech concatenating points by means of a single acoustic feature, and low accuracy of the detection of speech concatenating points in the prior art may be solved by adopting the above-mentioned technical solutions, thereby improving the accuracy of the detection on the speech concatenating points.

Alternatively, the detection module 410 is further configured to calculate a difference value of values in the feature sequences respectively corresponding to speech of any two frames in the speech to be detected in units of frame to obtain a first distance matrix, process the first distance matrix by means of a clustering algorithm to obtain a second distance matrix and perform the detection of speech concatenating points on the speech to be detected according to the second distance matrix.

In order to understand this embodiment, firstly, it is necessary to explain a training process of the neural network model. In the training of the neural network model, a distance matrix $A_{i,j}$ of N*N dimensions ($A_{i,j}=|x_i-x_j|$) is defined. The distance matrix $A_{i,j}$ is used to describe a distance between each frame of audio, which is also a training prediction target of the neural network model. i and j are the sequence numbers of elements in the feature sequence, and i and j may also be the sequence numbers of speech of any two frames in the speech to be detected corresponding to the elements in the feature sequence. In addition, $x_i$ and $x_j$ represent values in the feature sequence respectively corresponding to speech of any two frames in the speech to be detected. The values in the feature sequence respectively corresponding to speech of any two frames in the speech to be detected may be values of the elements in the feature sequence respectively corresponding to speech of any two frames in the speech to be detected.

Specifically, $A_{i,j}$ may be marked as follows:

$$A_{i,j} = \begin{cases} 1, \text{ if speech in an } i-th \text{ frame and speech in an } j- \\ \qquad th \text{ frame are from the same audio} \\ 0, \text{ if speech in an } i-th \text{ frame and speech in an } j- \\ \qquad th \text{ frame are from differenct audio} \end{cases}.$$

The corresponding element in $A_{i,j}$ is marked as 1 when the speech of the i-th frame and the speech of the j-th frame are from the same audio, i.e., the speech of the i-th frame and the speech of the j-th frame are not from spliced audios. Similarly, the corresponding element in $A_{i,j}$ is marked as 0 when the speech of the i-th frame and the speech of the j-th frame are from different audios, i.e., the speech of the i-th frame and the speech of the j-th frame are from spliced audios. The neural network model is trained by means of the $A_{i,j}$ after being subject to the above-mentioned marking After the training of the neural network model has completed, when the speech concatenating points are detected by using the neural network model, difference value of the values in the feature sequences respectively corresponding to speech of any two frames in the speech to be detected is calculated so as to obtain the first distance matrix. The first distance matrix may be subject to normalization, and the values of the elements in the first distance matrix may be between 0 and 1. The first distance matrix is processed by means of a clustering algorithm. In such a process, the value of an element, which is greater than a preset threshold, in the first distance matrix may be updated as a first value (e.g., the first value may be 1), and the value of an element, which is less than the preset threshold, in the first distance matrix may be updated as a second value (e.g., the second value may be 0), such that a second distance matrix is obtained. If the preset threshold is assumed to be 0.6, the value of an element greater than 0.6 in the first distance matrix may be updated as 1, and the value of an element less than 0.6 in the first distance matrix may be updated as 0, so that the second distance matrix, of which the elements are either 1 or 0, is obtained. That is, the second distance matrix is the same as the distance matrix $A_{i,j}$. The speech of two frames corresponding to the elements with value of 1 in the second distance matrix are determined as from the same audio, and the speech of two frames corresponding to the elements with value of 0 in the second distance matrix are determined as from the different audios.

Alternatively, the detection module 410 is further configured to update the values greater than the preset threshold in the first distance matrix as the first value, update the values less than the preset threshold in the first distance matrix as the second value, so as to obtain the second distance matrix, and determine that the speech of two frames corresponding to the second value in the second distance matrix are the speech concatenating points of the speech to be detected.

Alternatively, the detection module 410 is further configured to determine that the speech of two frames corresponding to the first value in the second distance matrix are not the speech concatenating points of the speech to be detected.

It should be noted that, in terms of effects, determining whether the speech of two frames corresponding to the first value or the second value are the speech concatenating points of the speech to be detected or not is equivalent to determining whether the speech to be detected is obtained by speech concatenating or not.

Alternatively, the modeling module 408 is further configured to input the parameter sequence into an encoder network so as to obtain a hidden variable sequence, wherein the neural network model includes the encoder network, and to input the hidden variable sequence into a decoder network so as to obtain the feature sequence, wherein the neural network model includes the decoder network.

The neural network model may be a first-encoding and then-decoding model consists of the encoder network and the decoder network. The neural network model may also include the encoder network, the decoder network, a matrix calculation network, and a detection network. Among them, the matrix calculation network may be utilized to realize the above calculation of the first distance matrix and the second distance matrix, and the detection network may be utilized to realize the detection of speech concatenating points on the speech to be detected according to the second distance matrix. If the neural network model only includes the encoder network and the decoder network, in the embodiment of the present disclose, the matrix calculation network and the detection network may be added correspondingly after the neural network model.

The parameter sequence may be a sequence of combined acoustic parameters related to the first cepstrum features and the second cepstrum features, and the feature sequence may be a frame-level feature sequence with consistency.

The encoder network includes a multilayer perceptron network, and the decoder network includes a multilayer recurrent neural network. Both the encoder network and the decoder network perform operations on respective inputs thereof in units of frame.

The perceptron network is utilized to implement a perceptron algorithm. The perceptron algorithm is a good two-category online algorithm. The perceptron algorithm is required to be a linearly separable model. The perceptron corresponds to dividing the instances into positive and negative samples in a space of inputs, and a separation hyperplane, that is a determining model, is utilized to separate the positive and negative samples. In the recurrent neural network, the current output of a sequence is also related to the previous output. Specifically, the network will memorize the previous information and apply it to the calculation of the current output, that is, nodes between the hidden layers in the recurrent neural network are connected rather than disconnected, and the input of the hidden layers includes not only output of input layers but also the output of the hidden layers at the previous moment. In order to make the feature sequence to be a frame-level sequence, the operations performed by the encoder network and the decoder network on respective inputs thereof are all in units of frame.

The first cepstrum features are Mel frequency cepstrum coefficients (MFCC), and the second cepstrum features are constant q transform cepstrum coefficients.

The Mel frequency cepstrum coefficients (MFCC) and the constant q transform cepstrum coefficients may be Constant Q Transform Cepstrum Coefficients (CQCC). In the case of taking extraction of MFCC of the speech as an example, Fourier transform is performed on the speech to obtain a spectrogram, then the spectrogram is multiplied by the MEL Cepstrum coefficient to obtain the Mel spectrum feature, and finally the MFCC coefficient is extracted according to the Mel spectrum feature.

Alternatively, the modeling module 408 is further configured to acquire a speech to be trained, wherein the speech to be trained includes: speech obtained by speech concatenating and speech obtained not by speech concatenating; extract third cepstrum features and fourth cepstrum features corresponding to the speech to be trained according to high-frequency components and low-frequency components of the speech to be trained; splice the third cepstrum feature and the fourth cepstrum feature of speech per frame in the speech to be trained in units of frame to obtain a parameter sequence of the speech to be trained; perform a first labeling process on the parameter sequence of the speech to be trained; and train the neural network model by means of the parameter sequence after being subject to the first labeling process.

It should be noted that the third cepstrum features and the fourth cepstrum features are actually the same as the first cepstrum features and the second cepstrum features, respectively, the purpose of different naming is just to distinguish whether they are features extracted from the speech to be trained or from the speech to be detected.

It should be noted that performing the first labeling process on the parameter sequence of the speech to be trained is to label the parameter sequence with a corresponding feature sequence.

In an embodiment of the present embodiment, the neural network model is trained by means of the parameter sequence after being subject to the labeling process, such that the neural network model has learned and stored the correspondence between the parameter sequence and the feature sequence. Further, when detecting speech concatenating points on the speech to be detected through the neural network model, the feature sequence is outputted from the neural network model, thereby the detection of speech concatenating points on the speech to be detected is performed according to the feature sequence.

Alternatively, the modeling module 408 is further configured to define a third distance matrix of the parameter sequence of the speech to be trained, perform a labeling process on the third distance matrix, and train the neural network model by means of the third distance matrix after being subject to the labeling process.

The third distance matrix defined is the distance matrix $A_{i,j}$.

Alternatively, the modeling module 408 is further configured to input the parameter sequence into the encoder network so as to obtain the hidden variable sequence, input the hidden variable sequence into the decoder network so as to obtain the feature sequence, and define the third distance matrix of the feature sequence.

Figure 5:
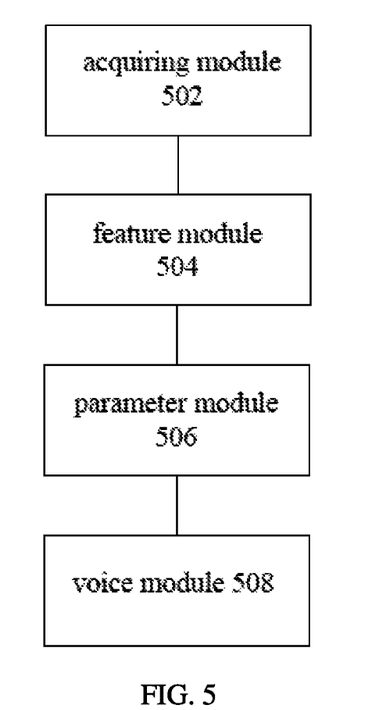
FIG. 5 schematically illustrates a structural block diagram (2) of a device for detecting speech concatenating points according to an embodiment of the present disclosure.

In an embodiment of the present disclosure, another device for detecting speech concatenating points is provided. FIG. 5 schematically illustrates a structural block diagram (2) of a device for detecting speech concatenating points according to an embodiment of the present disclosure, and as shown in FIG. 5, the device includes:

an acquiring module 502 configured to acquire a speech to be detected, and determine high-frequency components and low-frequency components of the speech to be detected;

a feature module 504 configured to extract first cepstrum features and second cepstrum features corresponding to the speech to be detected according to the high-frequency components and the low-frequency components;

a parameter module 506 configured to splice the first cepstrum feature and the second cepstrum feature of speech per frame in the speech to be detected in units of frame so as to obtain a parameter sequence; and a speech module 508 configured to perform detection of speech concatenating points on the speech to be detected by means of a neural network model according to the parameter sequence, wherein, the neural network model has been trained, has learned and stored a correspondence between the parameter sequence and the speech concatenating points.

In the present disclosure, the speech to be detected is acquired, and the high-frequency components and the low-frequency components of the speech to be detected are determined; the first cepstrum features and the second cepstrum features corresponding to the speech to be detected are extracted according to the high-frequency components and the low-frequency components; the first cepstrum feature and the second cepstrum feature of speech per frame in the speech to be detected are spliced in units of frame to obtain the parameter sequence; and the detection of speech concatenating points on the speech to be detected is performed according to the parameter sequence by means of the neural network model, wherein the neural network model has been trained, has learned and stored the correspondence between the parameter sequence and the speech concatenating points. In the embodiment of the present disclosure, due to that the first cepstrum feature and second cepstrum feature corresponding to the speech to be detected may be extracted according to difference information between the high-frequency component and the low-frequency component of the speech to be detected; the first cepstrum feature and the second cepstrum feature of speech per frame in the speech to be detected are spliced in units of frame to obtain the parameter sequence; and the detection of speech concatenating points on the speech to be detected is performed according to the parameter sequence, the problems of detecting speech concatenating points by means of single acoustic features, and low accuracy of the detection of speech concatenating points in the prior art may be solved by adopting the above-mentioned technical solutions, thereby improving the accuracy of the detection on the speech concatenating points.

The parameter sequence is inputted into the neural network model and the speech concatenating points of the speech to be detected are outputted from the neural network model.

Alternatively, the speech module 508 is further configured to acquire a speech to be trained, wherein the speech to be trained includes: speech obtained by speech concatenating and speech obtained not by speech concatenating; extract third cepstrum features and fourth cepstrum features corresponding to the speech to be trained according to high-frequency components and low-frequency components of the speech to be trained; splice the third cepstrum feature and the fourth cepstrum feature of speech per frame of the speech to be trained in units of frame to obtain a parameter sequence of the speech to be trained; perform a second labeling process on the parameter sequence of the speech to be trained; and train the neural network model by means of the parameter sequence after being subject to the second labeling process.

It should be noted that the third cepstrum features and the fourth cepstrum features are actually the same as the first cepstrum features and the second cepstrum features, respectively, the purpose of different naming is just to distinguish whether they are features extracted from the speech to be trained or from the speech to be detected.

It should be noted that performing the second labeling process on the parameter sequence of the speech to be trained is to label the parameter sequence with corresponding speech concatenating points.

In an embodiment of the present embodiment, the neural network model is trained by means of the parameter sequence after being subject to the labeling process, such that the neural network model has learned and stored the correspondence between the parameter sequence and the speech concatenating points. Further, when detecting speech concatenating points on the speech to be detected through the neural network model, it is recognized whether the speech to be detected is obtained by speech concatenating or not, and the location of the speech concatenating may be recognized at the same time.

Alternatively, the speech module 508 is further configured to define a third distance matrix of the parameter sequence of the speech to be trained, perform a labeling process on the third distance matrix, and train the neural network model by means of the third distance matrix after being subject to the labeling process.

The third distance matrix defined is the distance matrix $A_{i,j}$.

Alternatively, the speech module 508 is further configured to input the parameter sequence into the encoder network so as to obtain the hidden variable sequence, input the hidden variable sequence into the decoder network so as to obtain the feature sequence, and define the third distance matrix of the feature sequence.

It should be noted that each of the above modules may be implemented by software or hardware. For the latter, it may be implemented by, but not limited to, the following way: the above modules are all located in the same processor; or the above modules may be distributed in different processors in form of any combinations thereof.

In an embodiment of the present disclosure, an electronic device is provided.

Figure 6:
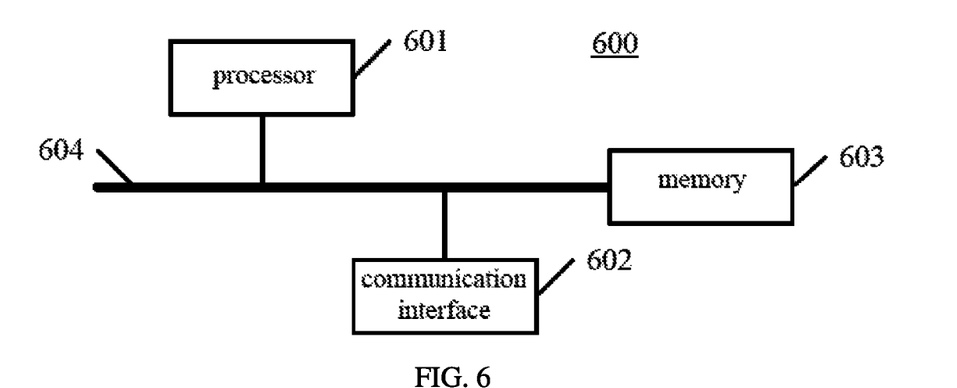
FIG. 6 schematically illustrates a structural block diagram of an electronic device provided by an embodiment of the present disclosure.

FIG. 6 schematically illustrates a structural block diagram of an electronic device provided by an embodiment of the present disclosure.

With reference to what's shown in FIG. 6, the electronic device 600 provided by the embodiment of the present disclosure includes a processor 601, a communication interface 602, a memory 603 and a communication bus 604. The processor 601, the communication interface 602, and the memory 603 communicate with each other through the communication bus 604. The memory 603 is configured to store computer programs, and the processor 601 is configured to execute the programs stored in the memory to implement the steps in any of the above-mentioned method embodiments.

Alternatively, the above-mentioned electronic device may further include a transmission device and an input and output device which is connected to the above-mentioned processor.

Alternatively, in the present embodiment, the above-mentioned processor may be configured to execute the following steps by means of computer programs:

acquiring a speech to be detected, and determining high-frequency components and low-frequency components of the speech to be detected;

extracting first cepstrum features and second cepstrum features corresponding to the speech to be detected according to the high-frequency components and the low-frequency components;

splicing the first cepstrum feature and the second cepstrum feature of speech per frame in the speech to be detected in units of frame to obtain a parameter sequence;

inputting the parameter sequence into a neural network model so as to obtain a feature sequence corresponding to the speech to be detected, wherein the neural network model has been trained, has learned and stored a correspondence between the parameter sequence and the feature sequence; and performing detection of speech concatenating points on the speech to be detected according to the feature sequence.

In an embodiment of the present disclosure, a non-transitory computer-readable storage medium is further provided. The above-mentioned non-transitory computer-readable storage medium stores the computer programs therein, and when the computer programs are executed by the processor, the steps in any of the above-mentioned method embodiments are implemented.

Alternatively, in the present embodiment, the above-mentioned non-transitory storage medium may be configured to store computer programs that execute the following steps:

acquiring a speech to be detected, and determining high-frequency components and low-frequency components of the speech to be detected;

extracting first cepstrum features and second cepstrum features corresponding to the speech to be detected according to the high-frequency components and the low-frequency components; splicing the first cepstrum feature and the second cepstrum feature of speech per frame in the speech to be detected in units of frame so as to obtain a parameter sequence;

inputting the parameter sequence into a neural network model so as to obtain a feature sequence corresponding to the speech to be detected, wherein the neural network model has been trained, has learned and stored a correspondence between the parameter sequence and the feature sequence; and performing detection of speech concatenating points on the speech to be detected according to the feature sequence.

The non-transitory computer-readable storage medium may be included in the equipment/device described in the above embodiments, or it may exist alone without being assembled into the equipment/device. The above-mentioned computer-readable storage medium carries one or more programs, and when the above-mentioned one or more programs are executed, the method according to the embodiments of the present disclosure is implemented.

According to an embodiment of the present disclosure, the computer-readable storage medium may be a non-volatile computer-readable storage medium, for example, may include but not limited to a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combinations of the above. In the present disclosure, the computer-readable storage medium may be any tangible medium that contains or stores programs, and the program may be used by or in combination with a system, a device, or an apparatus executed by instructions.

Alternatively, for specific examples of the present embodiment, reference may be made to the examples described in the above-mentioned embodiments and alternative implementations, and details are not described herein again in the present embodiment.

Obviously, those of skill in the art should understand that the above-mentioned modules or steps of the present disclosure may be implemented by a general computing device, and they may be integrated on a single computing device or distributed in a network composed of a plurality of computing devices. Alternatively, they may be implemented with program codes executable by the computing device, such that they may be stored in a storage device for execution by the computing device. In some cases, the steps shown or described herein may be executed in a different order. The steps shown or described herein also may be implemented by being manufactured into individual integrated circuit modules, respectively, or a plurality of modules or the steps therein may be implemented by being manufactured into a single individual integrated circuit module. In this way, the present disclosure is not limited to any specific combinations of hardware and software.

The foregoing descriptions are only preferred embodiments of the present disclosure, and are not intended to limit the present disclosure. For those of skill in the art, the present disclosure may have various modifications and alternations. Any modification, equivalent replacement, improvement, etc. made within the principles of the present disclosure shall be included in the protection scope of the present disclosure.

The invention claimed is:

1. A method for detecting speech concatenating points, comprising:
    acquiring a speech to be detected, and determining high-frequency components and low-frequency components of the speech to be detected;
    extracting first cepstrum features and second cepstrum features corresponding to the speech to be detected according to the high-frequency components and the low-frequency components;
    splicing the first cepstrum feature and the second cepstrum feature of speech per frame in the speech to be detected in units of frame so as to obtain a parameter sequence;
    inputting the parameter sequence into a neural network model so as to obtain a feature sequence corresponding to the speech to be detected, wherein the neural network model has been trained, has learned and stored a correspondence between the parameter sequence and the feature sequence; and
    performing detection of speech concatenating points on the speech to be detected according to the feature sequence.

2. The method according to claim 1, wherein performing detection of speech concatenating points on the speech to be detected according to the feature sequence comprises:
    calculating a difference value of values in the feature sequences respectively corresponding to speech of any two frames in the speech to be detected in units of frame so as to obtain a first distance matrix;
    processing the first distance matrix by means of a clustering algorithm so as to obtain a second distance matrix; and
    performing detection of speech concatenating points on the speech to be detected according to the second distance matrix.

3. The method according to claim 2, wherein, after calculating a difference value of values in the feature sequences respectively corresponding to speech of any two frames in the speech to be detected in units of frame so as to obtain the first distance matrix, the method further comprises:
    updating a value in the first distance matrix that is greater than a preset threshold to a first value, and updating a value in the first distance matrix that is less than the preset threshold to a second value, so as to obtain the second distance matrix; and
    determining that the speech in two frames corresponding to the second value in the second distance matrix are the speech concatenating points of the speech to be detected.

4. The method according to claim 1, wherein inputting the parameter sequence into the neural network model so as to obtain the feature sequence corresponding to the speech to be detected comprises:
  inputting the parameter sequence into an encoder network so as to obtain a hidden variable sequence, wherein the neural network model comprises the encoder network; and
  inputting the hidden variable sequence into a decoder network so as to obtain the feature sequence, wherein the neural network model comprises the decoder network.

5. The method according to claim 4, wherein
  the encoder network comprises a multilayer perceptron network,
  the decoder network comprises a multilayer recurrent neural network, and
  the encoder network and the decoder network perform operations on respective inputs thereof in units of frame.

6. The method according to claim 1, wherein the first cepstrum features are Mel frequency cepstrum coefficients, and the second cepstrum features are constant cepstrum coefficients, which are constant q transform cepstrum coefficients.

7. The method according to claim 1, wherein the method further comprises:
  acquiring a speech to be trained, wherein the speech to be trained comprises speech obtained by speech concatenating and speech obtained not by speech concatenating;
  extracting third cepstrum features and fourth cepstrum features corresponding to the speech to be trained according to high-frequency components and low-frequency components of the speech to be trained;
  splicing the third cepstrum feature and the fourth cepstrum feature of speech per frame in the speech to be trained in units of frame so as to obtain a parameter sequence of the speech to be trained; and
  performing a first labeling process on the parameter sequence of the speech to be trained and training the neural network model by means of the parameter sequence after being subject to the first labeling process, wherein the performing the first labeling process on the parameter sequence of the speech to be trained is to label the parameter sequence with a corresponding feature sequence.

8. The method according to claim 7, wherein, after splicing the third cepstrum feature and the fourth cepstrum feature of speech per frame in the speech to be trained in units of frame so as to obtain a parameter sequence of the speech to be trained, the method further comprises:
  defining a third distance matrix of the parameter sequence of the speech to be trained; and
  performing a labeling process on the third distance matrix, and training the neural network model by means of the third distance matrix after being subject to the labeling process.

9. A method for detecting speech concatenating points, comprising:
  acquiring a speech to be detected, and determining high-frequency components and low-frequency components of the speech to be detected;
  extracting first cepstrum features and second cepstrum features corresponding to the speech to be detected according to the high-frequency components and the low-frequency components;
  splicing the first cepstrum feature and the second cepstrum feature of speech per frame in the speech to be detected in units of frame so as to obtain a parameter sequence; and
  according to the parameter sequence, performing detection of speech concatenating points on the speech to be detected by means of a neural network model, wherein, the neural network model has been trained, has learned and stored a correspondence between the parameter sequence and the speech concatenating points.

10. A non-transitory computer-readable storage medium storing computer programs therein, wherein, when the computer programs are executed by a processor, the method according to claim 1 is implemented.

11. A non-transitory computer-readable storage medium storing computer programs therein, wherein, when the computer programs are executed by a processor, the method according to claim 9 is implemented.

* * * * *